J. ROMANO.
ATTACHMENT FOR BLOW TORCHES.
APPLICATION FILED APR. 11, 1919.
1,315,420.
Patented Sept. 9, 1919.
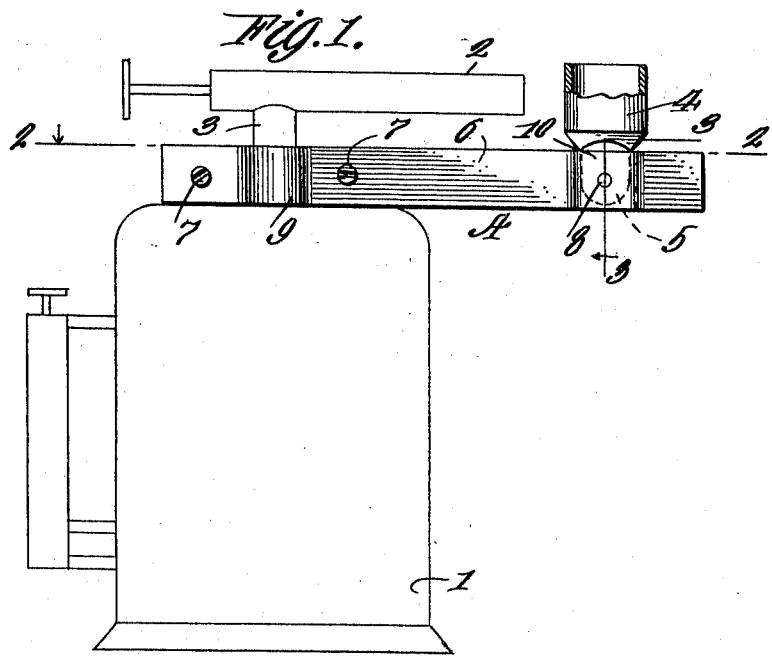
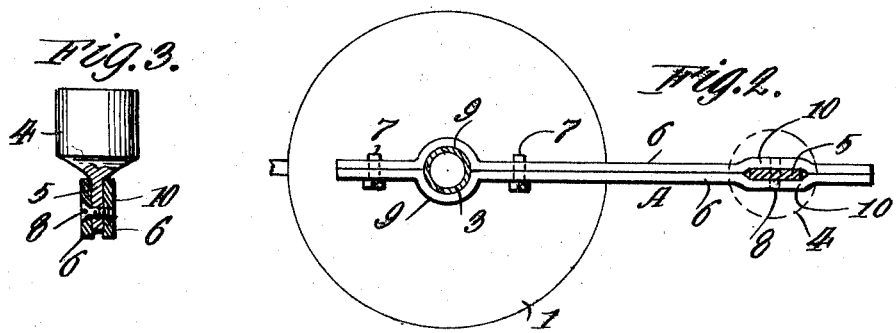
WITNESS:
Guy M. Spring
U. B. Hillyard.
INVENTOR.
JOSEPH ROMANO
BY
Richard B. Owen
ATTORNEY.

UNITED STATES PATENT OFFICE.

JOSEPH ROMANO, OF PHILADELPHIA, PENNSYLVANIA.

ATTACHMENT FOR BLOW-TORCHES.

1,315,420. Specification of Letters Patent. Patented Sept. 9, 1919.

Application filed April 11, 1919. Serial No. 289,212.

*To all whom it may concern:*

Be it known that I, JOSEPH ROMANO, a citizen of Italy, (has been granted first papers to be admitted citizen of the United States,) residing at Philadelphia, in the county of Philadelphia and State of Pennsylvania, have invented certain new and useful Improvements in Attachments for Blow-Torches, of which the following is a specification.

The invention has for its primary object to provide means for use in connection with an ordinary blow-torch, whereby solder or like fusible metal may be maintained in a molten state for use as required, the attachment being of such nature as to be readily applied to or disconnected from the torch, thereby admitting of the torch being used in any way for which it is adapted.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

The drawing illustrates the invention applied, and in the same;—

Figure 1 is a side view of a blow-torch having the attachment in position, a portion of the cup being broken away.

Fig. 2 is a horizontal section on the line 2—2 of Fig. 1, and

Fig. 3 is a detail section on the line 3—3 of Fig. 1.

Corresponding and like parts are referred to in the following description and indicated in the several views of the drawing by like reference characters.

The torch illustrated is of ordinary construction such as used by plumbers, braziers, and painters and comprises a body 1, a burner 2 and a connection 3 between the burner and body.

The attachment consists of a supporting member A and a cup 4, the latter being provided with a stem or shank 5. The supporting member A preferably consists of companion bars 6 which are disposed side by side and are connected by suitable fastenings 7 and 8. The bars 6 are outwardly deflected near one end, as indicated at 9, so as to fit about the connection 3. The fastenings 7 are disposed upon opposite sides of the outwardly deflected portions 9 so as to draw the same together to clamp the connection 3 and hold the supporting member A in the required position. The bars 6 are also outwardly deflected near their opposite ends to receive the shank 5 of the cup 4, as indicated most clearly in Fig. 2. The fastening 8 passes through the shank 5 and the outwardly deflected portions 10 of the bars, thereby retaining the cup in position. Upon removing the fastenings 7 the bars 6 may be readily separated to be applied to or disconnected from the part 3 of the torch. When the supporting member A is in position it is made secure by means of the fastenings 7 which draw the bars 6 and the parts 9 together to clamp the part 3. The supporting member A is of a length to project some distance beyond the end of the burner 2 and the cup 4 is supported upon the outer end of the member A in position to receive the flame from the burner. It follows that solder or fusible metal placed in the cup 4 is reduced to a molten state and maintained in such condition so long as the flame plays upon the cup, thereby admitting of the solder being used in any manner required. It is to be understood that in the event of the solder being used from the cup, the latter may be replenished, if it may be found necessary to maintain a sufficient amount of molten metal to meet requirements. When the torch is to be used in any way requiring the removal of the attachment, the latter may be easily and quickly disconnected from the torch and laid aside until required for future use when it may be readily replaced in position.

The foregoing description and the drawing have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

An attachment for a blow-torch, comprising companion bars placed side by side and having portions near opposite ends outwardly deflected fastening means for connecting the bars and a cup having a shank fitting the space between the outwardly deflected portions of the bars near the outer end thereof.

In testimony whereof I affix my signature in presence of two witnesses.

JOSEPH ROMANO.

Witnesses:
SIMON LINDENHEIM,
RALPH ROMANO.

Copies of this patent may be obtained for five cents each, by addressing the "Commissioner of Patents, Washington, D. C."